UNITED STATES PATENT OFFICE.

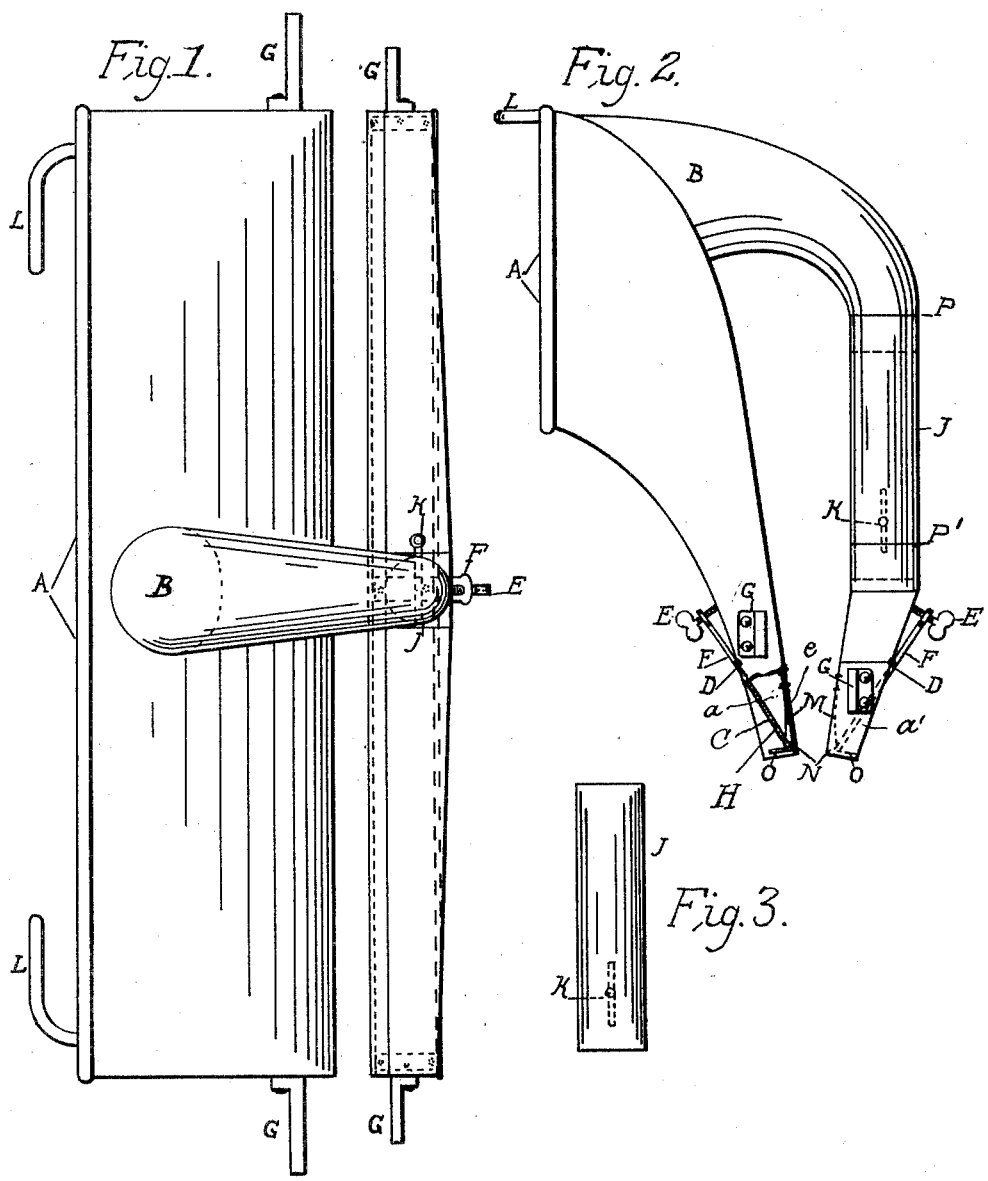

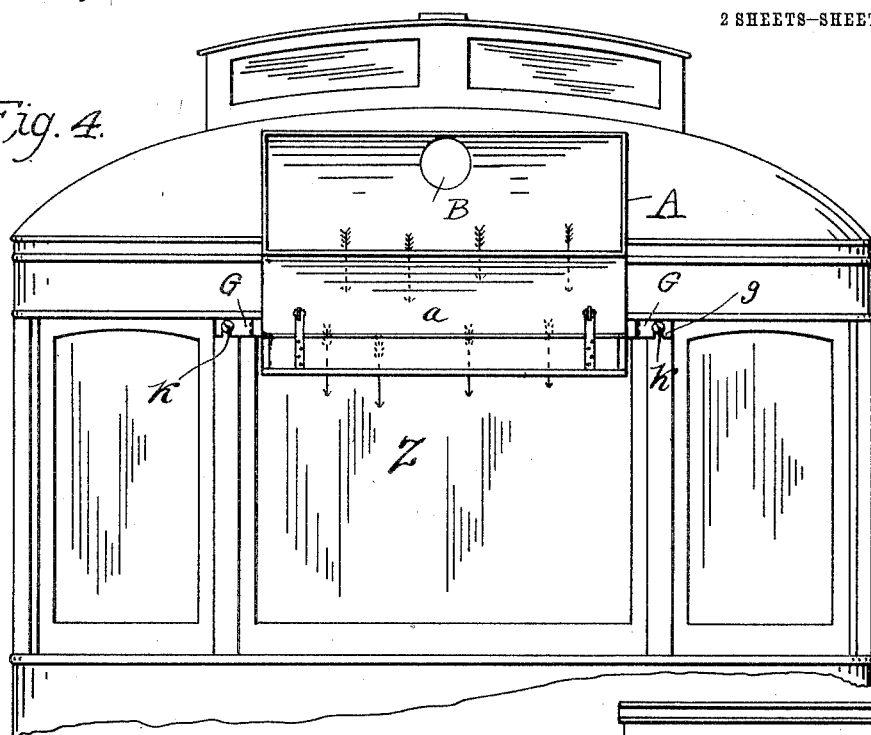
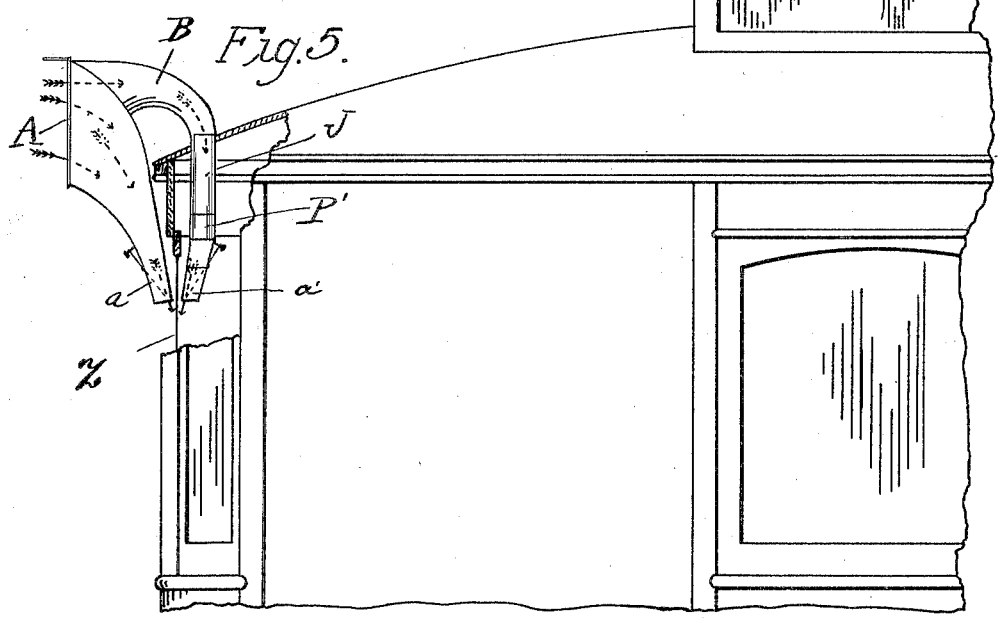

GEORGE N. McMILLAN AND MILTON L. DONAWAY, OF BELLINGHAM, WASHINGTON.

DEVICE TO KEEP FROST FROM WINDOWS.

1,009,849. Specification of Letters Patent. Patented Nov. 28, 1911.

Application filed March 29, 1911. Serial No. 617,633.

*To all whom it may concern:*

Be it known that we, GEORGE N. McMILLAN and MILTON L. DONAWAY, citizens of the United States, residing at Bellingham, in the county of Whatcom and State of Washington, have invented certain new and useful Improvements in Devices to Keep Frost from Windows, of which the following is a specification, reference being had to the accompanying drawings.

This invention is an improved device to keep frost, fog, vapor, rain drops, snow, hail and the like from accumulating on windows and is adapted especially for use on the vestibule window of a trolley car, or on the window of a locomotive cab, or of the pilot house of a vessel, or automobile, or electric vehicle, or on the wind shield of an automobile, and for other analogous uses, the object of the invention being to provide an improved device of this kind which may be readily manufactured at small cost, may be readily attached to a window or wind shield, and which will operate efficiently to prevent the window from being obscured by the accumulation of frost, ice, snow, rain drops, fog, or vapors thereon, the invention consisting in the construction, combination and arrangement of devices hereinafter described and claimed.

In the accompanying drawings—Figure 1 is a plan of a device constructed in accordance with our invention; Fig. 2 is a side elevation of the same. Fig. 3 is a detail elevation of one section of the duct which leads to the inner nozzle. Fig. 4 is a front elevation of a portion of a trolley car showing our improved device attached to the vestibule window thereof. Fig. 5 is partly an elevation and partly a sectional view of the same.

In accordance with our invention, we provide an air collector A. This is here shown as a funnel shaped structure, the mouth of which is rectangular and is disposed in a vertical plane. The body of the air collector or funnel extends downwardly and rearwardly from the mouth and the front and rear walls thereof converge downwardly so as to form a downwardly narrowing throat or nozzle $a$. This nozzle extends entirely across the upper portion of the window in connection with which the device is employed, and is disposed on the front or outer side of the window. This nozzle is open at its lower end, and its front wall terminates short of its lower end, to form an opening $b$, in which is disposed a valve C which in effect forms a part of the front wall of said nozzle. This valve is hinged at its upper side to the front wall of the nozzle as at D and is provided near its ends with upwardly and forwardly extending adjusting arms F each of which is provided with an adjusting screw E, the said adjusting screws bearing on the front wall of the nozzle. At the lower end of the valve is an out-turned forwardly extending flange O which greatly strengthens the construction of the valve. The valve is provided at its ends with rubber packing strips H which bear against the inner surfaces of the end walls $c$ of the nozzle, and prevent leakage. A spring M is secured on the front side of the rear wall $e$ of the said nozzle, and bears at its lower end against the rear side of the said valve C, the said spring co-acting with the adjusting screws E to keep the said valves in any desired adjusted position, the said valve regulating the effective area of the discharge opening or lower end of the nozzle as will be understood. The packing strips H are held in place by strips I.

In order to attach the device to the outer side of the frame of the vestibule window, we provide the front nozzle or outer nozzle with bracket lugs G at its ends, which lugs bear against opposite sides of the window frame, and have downwardly opening slots $g$ to engage supporting screws $h$ with which the window frame is provided. At the upper side of the mouth of the collector or funnel are trolley guards L.

A duct B leads downwardly and rearwardly from the rear side of the collector at the center thereof, and terminates in a vertical tubular portion P to which is detachably connected a pipe joint J which is provided with a pivotally mounted valve K. An inner or rear nozzle $a'$ is spaced from the rear side of the front nozzle or outer nozzle $a$, and is of such length as to also extend across the window, on the inner side of the window, and the front and rear walls of this inner nozzle also converge downwardly. The said inner nozzle is provided at its center on its upper side with a connector P' for attachment to the lower end of the pipe section J. Said pipe section together with the said connector and the part B form a duct to conduct air from the collector to the inner nozzle. In the rear side of the inner nozzle is a valve C' which is substantially identical with the valve seat of the outer nozzle, is hinged as at D', and is provided with arms F' each of which has an adjusting screw E'. At the lower end of the valve C', is an inturned flange O', which greatly strengthens the construction thereof. This valve C' is also provided at its ends with back strips 8' of rubber which are held in place by the strips I'. A spring M' has its upper end attached to the inner side of the front wall of said inner nozzle, its lower end bearing against the said valve C', the said spring coacting with the adjusting screws E' to hold said valve in any required adjusted position. In practice the collector with its nozzle, duct, and valves is preferably made of suitable sheet metal, but may be of any suitable material.

The operation of our invention is as follows: Owing to the forward motion of the car, locomotive vessel, automobile or other vehicle, to which the device is attached, a strong blast of air is created downwardly through the collector, the duct and the nozzles, and is divided between the outer and inner nozzles. These nozzles converge downwardly as shown, so that they discharge downwardly directed blasts of air both on the outer side and on the inner side of the window Z. Hence temperature is equalized on both sides of the window and condensation of vapors thereon is prevented. Moreover, the downwardly directed blast exerted on the outer side of the window by the outer nozzle acts mechanically to prevent rain drops, snow, hail, cinders, dust, and other obscuring objects from accumulating on the glass.

As here shown the duct B which leads to the inner nozzle, passes through the car roof. The detachable pipe section J which forms a part of this duct facilitates the installation of the device as will be understood.

While we have herein shown and described what we now consider a preferred form of our invention, we would have it understood that minor changes may be made in the form, proportion, and construction of the several parts, without departing from the spirit of our invention, and within the scope of the appended claims.

We claim:—

1. A device of the class described comprising an air collector, nozzles for disposition on the outer and inner sides of a window, and means to convey blasts of air from the air collector to the said nozzles for the purpose set forth.

2. A device of the class described comprising an air collecting funnel having a downwardly directed throat terminating in a downwardly opening outer nozzle, a downwardly and rearwardly directed duct leading from the rear wall of the air collecting funnel, and a downwardly directed inner nozzle connected to the said duct.

3. A device of the class described comprising outer and inner nozzles for disposition respectively on the outer and inner sides of a window, and an air collector to supply blasts of air to the said nozzles, and cause the latter to direct said air blasts across the outer and inner sides of the window.

4. A device of the class described comprising outer and inner nozzles for disposition respectively on the outer and inner sides of a window, and an air collector to supply blasts of air to the said nozzles, and cause the latter to direct said air blasts across the outer and inner sides of the window, each of said nozzles having a valve to vary the effective area of the discharge opening thereof.

5. A device of the class described comprising outer and inner nozzles for disposition respectively on the outer and inner sides of a window, and an air collector to supply blasts of air to the said nozzles, and cause the latter to direct said air blasts across the outer and inner sides of the window, each of said nozzles having a valve to vary the effective area of the discharge opening thereof, the said valves being provided with adjusting devices to hold said valves in any desired position.

In testimony whereof we hereunto affix our signatures in the presence of two witnesses.

GEORGE N. McMILLAN.
MILTON L. DONAWAY.

Witnesses:
E. D. MILLER,
LAURETTA C. MORGAN.

---

Copies of this patent may be obtained for five cents each, by addressing the "Commissioner of Patents, Washington, D. C."